United States Patent
Finzel et al.

(10) Patent No.: US 6,786,677 B2
(45) Date of Patent: Sep. 7, 2004

(54) CHANNEL OR PIPE SYSTEM, METHOD FOR SANITIZING A CHANNEL OR PIPE SYSTEM AND FOR INSTALLING A CABLE OR A RESERVE CONDUIT AND DEVICE FOR INSTALLING A CABLE OR A RESERVE CONDUIT

(75) Inventors: Lothar Finzel, Unterschleissheim (DE); Hans-Jurgen Konig, Kreuzau-Stockheim (DE); Klaus D. Schmager, Ruppichteroth-Winterscheid (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/257,305

(22) PCT Filed: Apr. 9, 2001

(86) PCT No.: PCT/DE01/01389
§ 371 (c)(1),
(2), (4) Date: Oct. 10, 2002

(87) PCT Pub. No.: WO01/79907
PCT Pub. Date: Oct. 25, 2001

(65) Prior Publication Data
US 2003/0175084 A1 Sep. 18, 2003

(30) Foreign Application Priority Data
Apr. 13, 2000 (DE) .......................... 100 18 380

(51) Int. Cl.⁷ ............................. F16L 7/00; F16L 9/18
(52) U.S. Cl. .................. 405/183.5; 405/184; 138/98; 138/112; 138/114; 138/148; 156/287
(58) Field of Search ............................. 405/187.5, 184, 405/184.1, 184.5; 138/97, 98, 111–114, 148; 364/269, 516; 156/287, 294, 94

(56) References Cited

U.S. PATENT DOCUMENTS

| | | | | |
|---|---|---|---|---|
| 813,918 A | * | 2/1906 | Schmitz ...................... 138/114 |
| 2,440,245 A | * | 4/1948 | Chevigny ................... 138/114 |
| 5,395,472 A | * | 3/1995 | Mandich ...................... 156/287 |
| 5,725,328 A | * | 3/1998 | Schmager ................ 405/184.2 |
| 5,762,450 A | * | 6/1998 | Schmager ................ 405/184.2 |
| 5,971,029 A | | 10/1999 | Smith et al. .................. 138/98 |
| 6,116,290 A | * | 9/2000 | Ohrn et al. ................. 138/148 |

FOREIGN PATENT DOCUMENTS

| | | | | |
|---|---|---|---|---|
| DE | 3500699 | * | 7/1986 | ................. 405/184 |
| DE | 19607267 C1 | | 7/1997 | ............. F17D/5/02 |
| DE | 19701787 A1 | | 7/1998 | ............ G02B/6/50 |
| DE | 29814270 U1 | | 1/1999 | ............. E03F/3/06 |

(List continued on next page.)

OTHER PUBLICATIONS

Lothar Finzel and Kirsten Hayer; "Daten–Highway im Kanal", Feb. 2000.
Troling GmbH, "The Troling® system with Integrated Cable Ducts", May 1999.

Primary Examiner—Jong-Suk Lee

(57) ABSTRACT

A canal or pipe system and process for rehabilitation of a canal or pipe system and for installation of a cable or empty tube into a canal or pipe system as well as device for installation of a cable or empty tube.

For rehabilitation of a canal or pipe system (AR) an outer casing (AL1) is inserted. Subsequently, an inner casing (IL1) with help by distancing elements (AH) is inserted, so that a ring gap (RS) between the inner and outer casings (IL1, AL1) is created. A cable (OC1) or empty tube (LR) to be installed is inserted together with the inner casing (IL1) in such a way, that the cable (OC1) or empty tube (LR) comes to rest in the ring gap (RS). For rehabilitation of the canal or pipe system, where a cable (OC1) or empty tube (LR) is already installed at an inner wall (IW), only the inner casing (IL1) will be inserted into the canal or pipe system (AR), so that the ring gap (RS) is created between the inner wall (IW) and the casing (IL1). In both cases, the respective cable or empty tube is protected against environmental influences and can be exactly positioned.

31 Claims, 8 Drawing Sheets

FOREIGN PATENT DOCUMENTS

| | | | | |
|---|---|---|---|---|
| DE | 29815744 U1 | 1/1999 | ............ | F16L/3/01 |
| DE | 29816103 U1 | 1/1999 | ............ | H02G/9/06 |
| DE | 19826155 A1 | 2/2000 | ............ | E03F/3/06 |
| EP | 0643789 B1 | 3/1996 | ............ | E03F/3/06 |
| EP | 0942504 A1 | 9/1999 | ............ | H02G/1/08 |
| JP | 02236079 * | 9/1990 | ................ | 405/184 |
| WO | WO99/65129 | 12/1999 | ............ | H02G/9/06 |

\* cited by examiner

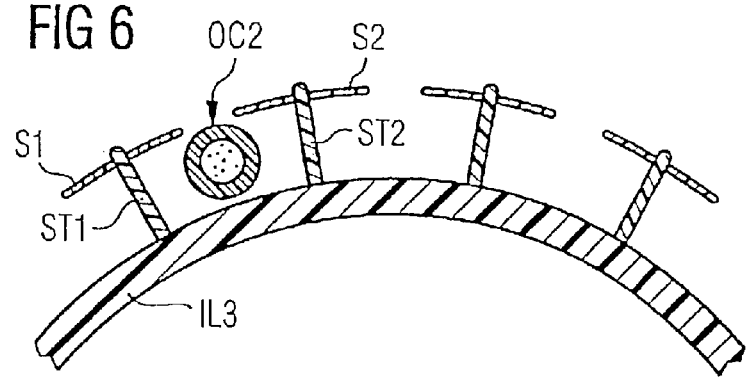
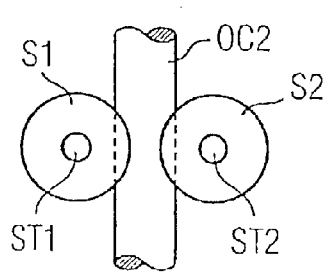
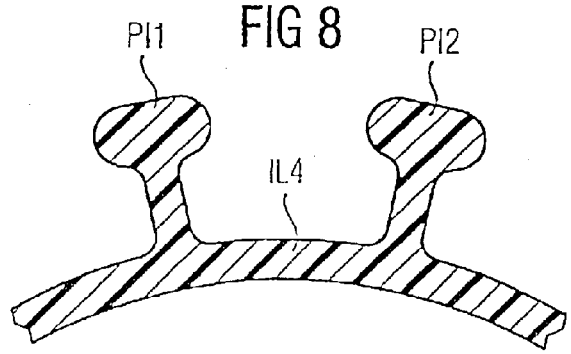
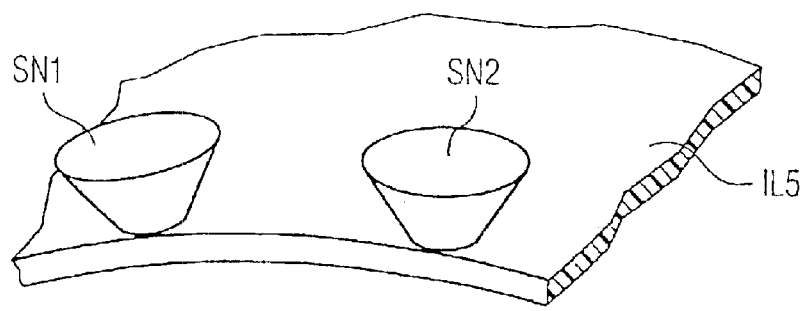

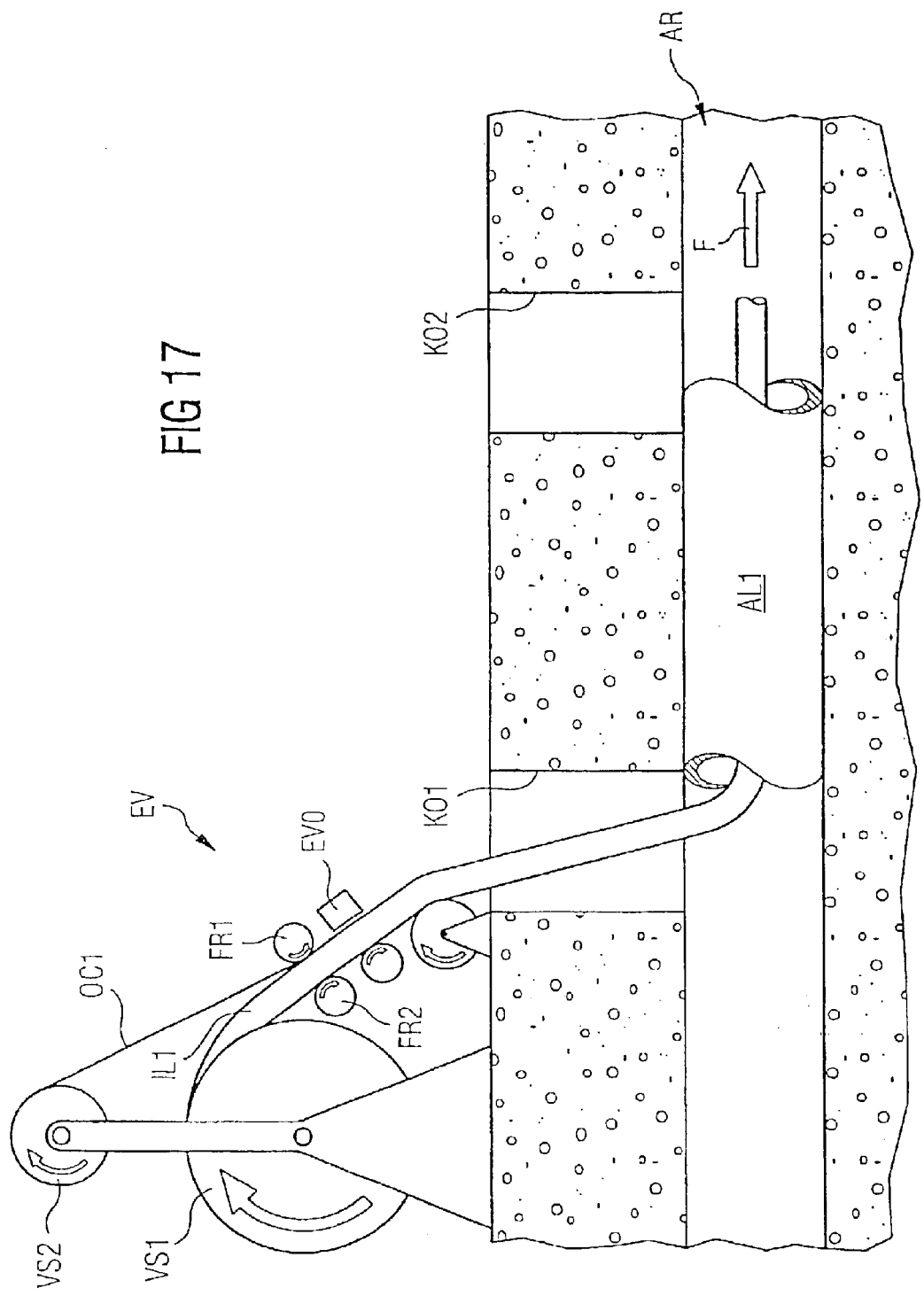

CHANNEL OR PIPE SYSTEM, METHOD FOR SANITIZING A CHANNEL OR PIPE SYSTEM AND FOR INSTALLING A CABLE OR A RESERVE CONDUIT AND DEVICE FOR INSTALLING A CABLE OR A RESERVE CONDUIT

FIELD OF THE INVENTION

Canal or pipe system and process for rehabilitation of a canal or pipe system and for installation of a cable or empty tube into a canal or pipe system as well as device for installation of a cable or empty tube

BACKGROUND OF THE INVENTION

The present invention concerns a canal or pipe system with at least one installed cable and/or empty tube, a process for rehabilitation of a canal or pipe system, into which at least one cable or empty tube is installed at the inner wall of the canal or pipe system, a process for the installation of at least one cable or empty tube into a canal or pipe system, as well as a device for the installation of a cable or empty tube into a canal or pipe system during its rehabilitation.

Canal or pipe system, especially waste water canal systems or waste water pipe systems, respectively, in practice are often in need of rehabilitation. It is therefore obvious, to combine the repair measures with the installation of f.e. an optical fiber cable for telecommunication purposes into the waste water canal. The rehabilitation of a waste water canal network is an expensive project depending on the amount of damage, relative to the economic as well as the time expenditures. These expenditures which are already necessary will become significantly higher by a combined installation of f.e. telecommunications cables or empty tubes for subsequent installation of cables. It is customary during rehabilitation, to subsequently insert waterproof hoses into the canal system, which will waterproof damaged points, in order to avoid underground construction.

In some canal or pipe systems cables or empty tubes are already installed at the inner wall of the canal or pipe system. For these canal or pipe systems it can be necessary to rehabilitate due to damages or wear.

In DE 198 490 39.9 a process for fastening cables in canal or pipe systems is described, where the cable is anchored between two canal manholes. In this way, a sag of the cable can occur in partial areas of the canal or pipe system. The cable thus is exposed to environmental influences in the canal or pipe system.

From "KA Water Management, Waste Water, Waste" 2000 (47) No. 2, February 2000, pages 279 to 282 it is known, how to combine new installation of cables with rehabilitation activities. The cable can be fitted between knobs on a hose-like so-called inliner. The cable is hereby protected against mechanical and chemical stresses in the ring gap formed by the knobs.

SUMMARY OF THE INVENTIONS

It is the objective of the present invention, to provide a process for the installation of at least one cable or empty tube into a canal or pipe system that can be combined with the rehabilitation of the canal or pipe system.

Additionally, it is the objective of the present invention to provide a process for the rehabilitation of a canal or pipe system, where at least one cable or empty tube is already installed at the inner wall of the canal or pipe system.

It is also the objective of the present invention, to provide a cable or pipe system with at least one installed cable or empty tube, which is characterized by the respective cable or empty tube being protected against environmental influences and being exactly positioned.

Furthermore, it is the objective of the present invention, to provide a device for installation of at least one cable or empty tube into a canal or pipe system during its rehabilitation.

The objective concerning the process for installation of a cable or empty tube is solved by a process for installation of at least one cable or empty tube into a canal or pipe system, where at least one outer casing is placed into the canal or pipe system, where subsequently at least one inner casing is being placed by means of distancing elements, so that a ring gap is formed between the inner and outer casing, and where the cable or empty tube to be installed is placed with the inner casing in such a way that the respective cable or empty tube comes to rest in the ring gap.

The objective relative to the rehabilitation of a canal or pipe system is solved by a process for the rehabilitation of a canal or pipe system, where at least one cable or empty tube has been installed at the inner wall of the canal or pipe system, where at least one casing is placed into the canal or pipe system by means of distancing elements, so that a ring gap between the inner wall of the canal or pipe system and the casing is produced, and where the casing is placed in such a way, the respective cable or empty tube is arranged in the ring gap.

For the cables, power cables as well as control cables, data and/or general telecommunications cables can be used. These are f.e. optical fiber cables, which can transmit telecommunications or data, respectively, by means of optical fibers. For this purpose, the individual fibers or the thin optical fiber cables, respectively, are securely enclosed in the ring gap. The distancing elements, f.e. knobs, bulges and such, secure an equal distance and thus the maintenance of an equal ring gap.

Generally, defective waste water canal or pipe system are rehabilitated with the casings, without the necessity of underground work. For this, the casings, f.e. in the form of hoses, are pulled into the canal or pipe system to be rehabilitated. After insertion they are placed into the determined position and stabilized.

In the process of the new installation of a cable or empty tube, the outer casing forms thus the first protection layer at the damaged point of the canal or pipe system. Subsequently, the inner casing equipped with unilaterally extruded knobs is pulled into the outer casing together with the cable or empty tube. Since the cable is preferably very thin, one or even more cable strands can be placed between the distancing elements in the form of knobs, without having to decrease the canal cross-section or the formation of buckling. The cable or the empty tube, respectively, have the same coefficient of thermal elongation as the rehabilitation area of the casings, so that temperature stresses cannot occur either during installation or during operation.

For the process for rehabilitation of the canal or pipe system, the cable or empty tube, respectively, is already installed at the inner wall of the canal or pipe system. The ring gap is formed between the inner wall of the canal or pipe system and the inserted casing. Here also it is made sure, that the cable or empty tube does not rest on the inner wall of the canal or pipe system. Thus the inner active canal and pipe cross-section is not changed by the cable or empty tube, respectively.

The gap in the form of a ring gap measures f.e. 10 to 20 mm and serves for the reception of cables, preferably promising optical fiber cables (LWL cables). Even for relatively small and thin cables, higher fiber numbers (f.e. 144 optical fibers or more) can be contained in small cable diameters. The small diameters ensure, that no additional space is needed for accommodation of cables or empty tubes after rehabilitation of the canal or pipe system and that the symmetrical nature of the canal or pipe system is maintained.

The ring gap between the preferably concentric casings or between the inner wall of the canal or pipe system and a casing, respectively, is filled in the construction form with a filling medium, f.e. in the form of concrete for increasing static stability. The inserted cables or empty tubes, respectively, preferably have a high compression resistance and can therefore be placed directly into the special concrete. For increasing static stability, the cables or tubes are preferably surrounded by the filling material. Additionally, for a so-called micro cable the so-called PE jacket can be eliminated. Thus the metal tube of the cable is connected to the filling material tensionally and form-locking and thus further increases the static stability.

The objective relative the canal or pipe system is solved by a canal or pipe system with at least one installed cable and/or empty tube, where at least one casing is placed into the canal or pipe system by means of distancing elements in such a way, that a ring gap between the inner wall of the canal or pipe system and the casing is formed, and where the respective cable and/or empty tube is arranged in the ring gap, and where the path of the cable and/or the empty tube in longitudinal direction or circumference direction of the canal or pipe system is determined by the distancing elements.

The arrangement of the cables or the empty tube, respectively, guarantees, that the respective cable or empty tube is housed protected against environmental influences. The arrangement of distancing elements guarantees additionally, that the path of the cable or the empty tube, respectively, can be exactly positioned. It is advantageous, if the respective cable or empty tube can be movable during installation in the longitudinal direction of the canal or pipe system. Besides this, a cable excess length can purposely be placed, so that no shortening of the cable or fibers, respectively, occurs during static of dynamic stresses. This can actively avoid attenuation increases due to so-called macrobending or microbending, respectively.

The distancing elements are constructed as a plurality. The distancing elements are preferably placed in such a way, that the cable or empty tube, respectively, can be inserted preferably in a straight line and without bending between the casings or between a casing and the inner wall of the canal or pipe system, respectively. The distancing elements are placed in a further construction in such a way, that the cable or empty tube, respectively, is arranged in loops or a helical form. The cable is placed between the distancing elements, and positioned from them, until a filling with special concrete can be done.

With the arrangement of the canal or pipe system according to the invention it is advantageously possible, that the cable or empty tube, respectively, is placed at the underside of a waste water canal or pipe system. Since normally no canal inlets are located at the underside of a main waste water canal system, the cable or empty tube, respectively, does not have to pass by feeder pipes or inlets. In case this is necessary, f.e. if the cable or empty tube is located in the upper area of the canal or pipe system, a bypass of feeder pipes, branch pipes or inlets can be made by means of the distancing elements. The invention has the advantage, that the cable can be placed at any desired point and location within the circumference of the waste water pipe or waste water canal, respectively.

The invention has also the advantage, that the usable cross-section of the canal or pipe system is not affected by the cable or empty tube. In the same way, the hydraulics of the water guided in the canal or pipe system is not influenced by an embedded cable or empty tube. The favorable conditions achieved by the rehabilitation are not affected by the installed cable or empty tube. Additionally, the static resistance of the canal or pipe system rehabilitation is not affected by the empty tubes or cables.

The objective concerning the device for installation of a cable or empty tube is solved by a device for the installation of at least one cable or empty tube into a canal or pipe system during its rehabilitation, where at least one insertion device is provided, by which at least one inner casing and at least one outer casing can be inserted into the canal or pipe system together with distancing elements in such a way, that a ring gap between the inner casing and the outer casing is formed, and where one installation direction is provided for position controlled installation of the cable or empty tube onto the inner casing, so that the respective cable or empty tube comes to rest in the ring gap.

The device according to the invention has the advantage, that the cable or empty tube, respectively, to be installed can be placed onto the inner casing at the installation location. This is advantageous, because a cable or empty tube, respectively, has often to be transported over the area of a canal or pipe system to be rehabilitated. It is also advantageous, because the cable often must be transported over the area of a manhole of the canal or pipe system.

BRIEF DESCRIPTION OF THE DRAWING FIGURES

FIG. 1 a cross-section of the construction form of a cable or pipe system according to the invention, FIGS. 2 to 11 further detailed construction forms of the invention FIGS. 12 to 15 top view of further construction forms of the invention FIG. 16 a further construction form of the canal or pipe system FIG. 17 a construction form of a device for installation of a cable or empty tube.

DETAILED DESCRIPTION OF THE INVENTION

FIG. 1 shows a cross-section of a construction form of a canal or pipe system AR with an installed cable OCR, a cable OCR and an empty tube LR. The cable OC1 is an optical cable. It shows the form of a so-called maxibundle core, which contains a bundle of several optical fibers LWB. The so-called maxibundle core is surrounded by a jacket MR1 and an outer jacket AM. The outer cable jacket can be eliminated in certain cases. The cable OC2 also is an optical cable, and shows individual optical fibers LW. The optical fibers LW are surrounded by a jacket MR2. Between the optical fibers LW the optical cable OC2 shows a filling medium FM is shown.

The canal or pipe system AR further shows an inner casing IL1, where distancing means AH are arranged in the form of individual distancing elements. The ring gap RS between the inner wall IW of the canal or pipe system and the casing IL1 is formed by the distancing elements AH. Between the inner wall IW and the distancing element AH an outer casing AL1 is provided in this construction form. In this way the gap RS is formed between the inner casing IL1 and the outer casing AL1. The respective cables OC1, OC2 and the empty tube are arranged in the ring gap RS. The distancing elements AH show a radial extension relative to the central axis ZA. The cables OC1, OC2 and the empty tube LR or their paths, respectively, are given by the distancing elements AH in the longitudinal direction in reference to the central axis ZA and in the circumference direction of the canal or pipe system. This can later be seen in the top view of later diagrams. The inner and outer casings are also designated as so-called inliners or preliners.

FIG. 1 further shows knob-like distancing holders HA, which are arranged on the outer casing AL1 at the side of the ring gap RS. The distancing holders HA are provided for the respective cable OC1, OC2 or the empty tube, respectively, to be positioned on them, as shown in FIG. 1. This guarantees, that the empty tube is securely enclosed during later filling with f.e. a special concrete. This special concrete forms the filling medium FB, which fills the hollow space of the ring gap RS and which contributes to mechanical stabilization of the arrangement of inner casing IL1 and outer casing AL1.

The casing IL1 has a multitude of individual distancing elements AH on its side toward the outer casing AL1. These distancing elements AH are constructed in the form of knobs, beads, distancing holders or pins. Additional immobilizing elements NH are provided on the distancing elements AH in FIG. 1, which substantially avoid a slipping out in the radial direction.

Subsequently, a construction form of the process for the installation of a cable OC1 or an empty tube LR into the canal or pipe system will be described by the construction form according to FIG. 1.

First the outer casing AL1 is inserted into the canal or pipe system AR, then the inner casing with the distancing elements AH, so that the ring gap RS between the inner and outer casings is formed. The cable OC1 or the empty tube LR, respectively, to be installed is inserted with the inner casing IL1, so that the cable OC1 or the empty tube LR, respectively, rests in the ring gap RS. The cable OC1 or the empty tube LR, respectively, is inserted into a gap between two adjacent distancing elements AH.

In the following, the process will be explained with the example of the cable OC1. After insertion into a gap between the two distancing elements AH, the cable OC1 is secured in its location against slipping out in the radial direction by means of the immobilizing elements NH. The immobilizing elements NH are placed at the radial outer end of the respective distancing elements AH; the cable OC1 is placed between them. The distancing elements AH are preformed in such a way, that they show an extension in the radial direction relative to the central axis ZA of the canal or pipe system after installation between the inner and outer casing. In a special construction form of the process it is possible, that the cable OC1 is inserted between the distancing elements AN in advance during the manufacture of the inner casing IL1.

The outer casing AL1 is advantageously inserted into the canal or pipe system in such a way, that the inner wall of the canal or the pipe AR, respectively, is coated and in contact. The outer casing AL1 serves additionally for stabilizing the casing system in case a large piece of the inner wall of the canal AR, which is made of ceramic, is broken out. The casings are preferably made of plastic (HDPE), which unfolds after insertion into the canal or pipe system AR in the desired position of the casings and can be blown up into the final desired position. To increase the stability of the arrangement of the casings IL1 and AL1 the hollow space of the gap RS is finally filled with a filling medium FB, f.e. in the form of a special concrete.

The arrangement according to FIG. 1 shows especially the following advantages. The ring gap RS between the two casings IL1 and AL1 serves for the reception of the cables OC1, OC2 and the empty tube LR. They are therefore protected against environmental influences within the inner casing IL1 of the canal system. With this arrangement and especially due to the filling with a special concrete, the static resistance of the casing system is not affected by the empty tube and the cable. In case the cable can withstand high compression and the cable jacket is made from metal, it can function as supporting element of the total group during outer stress on the canal system AR. Due to the arrangement, the usable cross-section of a canal or pipe is not affected. In the same way, the hydraulics of the water flowing in the canal system, is not affected by the cable or empty pipe, respectively. The cable or the empty tube respectively, can additionally be placed at any desired position and location within the circumference of the canal or pipe AR. The combination of the distancing holder AH and f.e. the cable OC1 is advantageously formed in such a way, that there is sufficient play for the cable to be moved around in the longitudinal direction before final filling with concrete.

The described advantages of the arrangement in FIG. 1 can also be used for a process of rehabilitation of a canal or pipe system AR, where f.e. the cable OC1 is already installed at the inner wall of the canal or pipe system AR (there is no outer casing AL1 in this case). The casing IL together with the distancing elements AH is inserted into the canal system AR, so that a ring gap RS is formed between the inner wall IW and the casing IL1. The casing IL1 is thereby inserted in such a way, that the cable OC1 is located in the ring gap RS. Here also the cable OC1 is arranged advantageously in a gap between two adjacent distancing elements AH. To increase the stability of the arrangement, the hollow space of the ring gap RS can finally again be filled with the filling medium FB.

The last process described can also be combined with a new installation of a cable or empty tube. Both processes described can be supplemented in such a way, that a subsequent installation of f.e. a cable is possible. According to FIG. 1, a cable to be installed is fastened to a hoisting rope, by which the cable to be installed is placed into the ring gap RS afterwards. The hoisting rope ZS is connectorized at the plant and is delivered together with the inner casing IL1 for installation.

FIG. 2 shows a further construction form of the canal or pipe system AR according to the invention. FIG. 2 shows the cable OC1, which is placed into a gap between two adjacent distancing elements AH. The optical cable OC1 in this arrangement is essentially secured against slipping out in the radial direction by the immobilizing elements NH. A film KF is provided, which is put over the distancing elements AH at openings SL, f.e. in the form of slits. The film KF shows in a preset pattern holes or cross-like cuts SL. In this way, the film KF can be put from above onto the distancing holders AH. By easy pressure from above, the film KF is lowered until the distancing elements AH protrude from the film KF and thus the slits SL engage behind the immobilizing elements NH. In this way, the cable OC1 is secured in its position, but can be adjusted in the longitudinal direction. Since the film KF is placed parallel to the inner casing IL1, it is no impediment for the filling material coming in along the flow direction. The static resistance of the inner casing IL1 is not affected by the film KF.

In another variant, the distancing elements AH are deformed by heat and thus the cable OC1 can also be stationed. In this connection it is also possible to have a film ribbon at the sides with half holes. In this way, it would always be in a secure position between the distancing elements AH.

FIG. 3 shows a further construction sample of the invention, where an immobilizing element NH is formed as a so-called U-disc US. The distancing elements AH are thus formed as knobs NO1 and NO2. They are arranged on the inner casing IL2; they form a gap, into which the cable OC1 comes to rest. A top view of the arrangement is shown in FIG. 4. The U-disc surrounds the knobs NO1 and NO2, so that the cable OC2 is securely positioned against slipping out in the radial direction.

FIG. 6 shows a construction form of the invention, where there are distancing elements in the form of pins ST1 and ST2 are located on the inner casing IL3. At the end of the respective pins ST1 and ST2 discs S1 and S2 are placed, which avoid a radial slipping out of the cable OC2 in the radial direction.

FIG. 7 shows a top view of the construction sample according to FIG. 6. The discs S1 and S2 are in circular form and overlap in parts of their surface with the cable OC2. In this way the cable OC2 is securely positioned.

FIG. 8 shows a construction form of the invention, where distancing elements in the form of mushroom-like distancing elements PI1 and PI2 are placed on the casing IL4. The distancing elements PI1 and PI2 are formed in such a way, that a fastening of the cable or empty tube in the radial direction is created by the formation.

Figure 10:
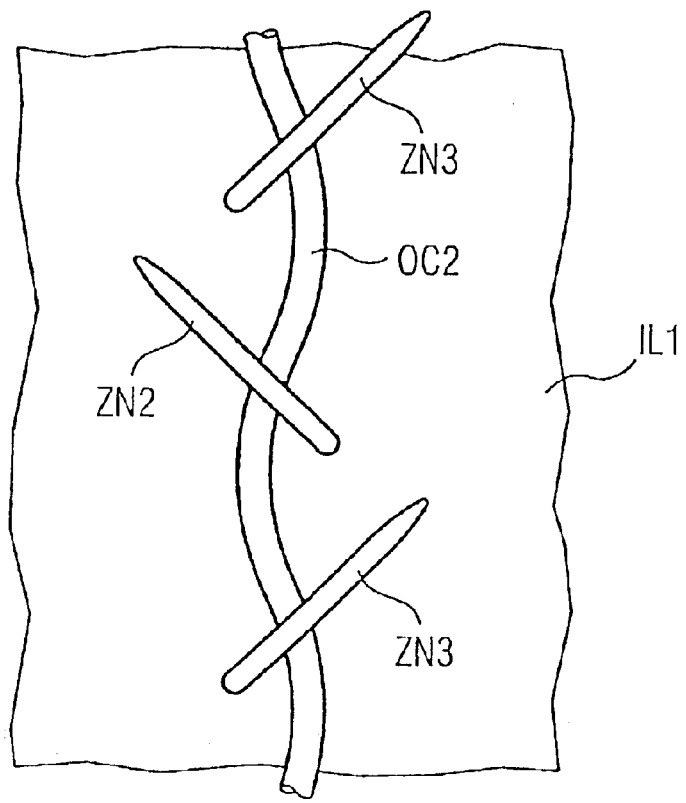
Figure 11:
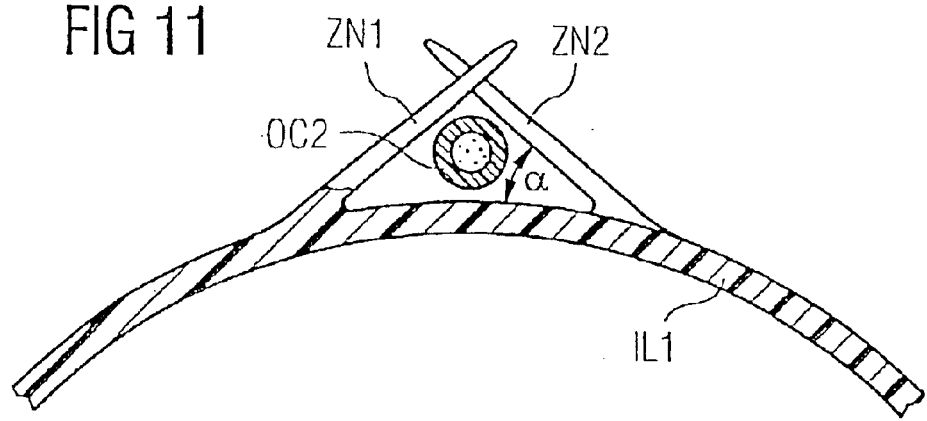

In FIG. 9 a further construction form of distancing elements is shown. These are constructed as distancing elements SN1 and SN2, which are conical at the bottom towards the casing IL5. Their formation also enables a fastening of a cable or empty tube in the radial direction. FIG. 10 shows distancing elements, which are formed tooth-like as distancing elements ZN1 to ZN3. As depicted in connection with FIG. 11, the toothlike distancing elements ZN1 and ZN2 are positioned in a slanting angle α away from the casing IL1, so that a fastening of the cable OC2 occurs.

Figure 12:
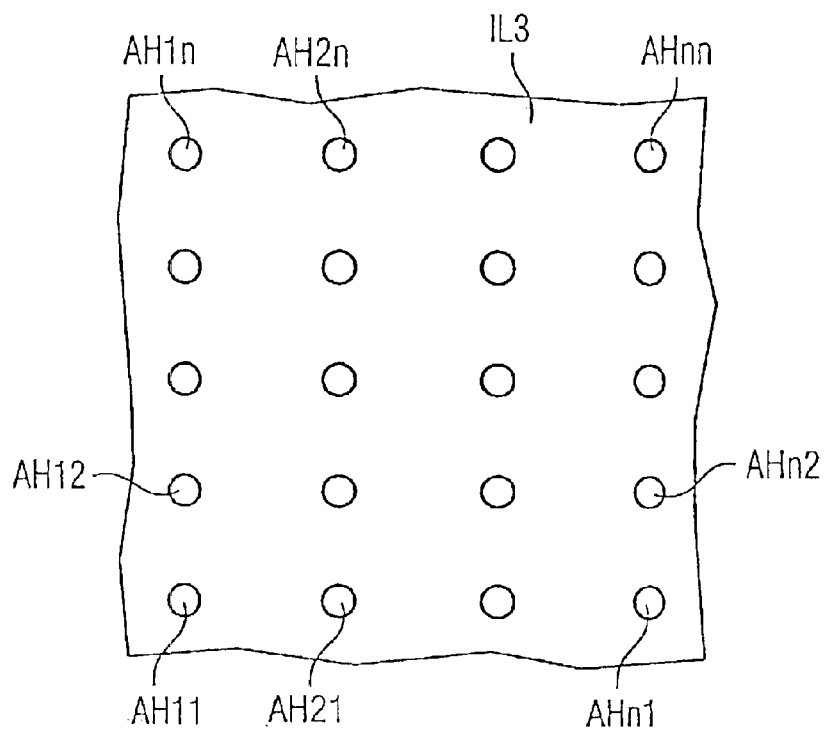

FIG. 12 shows a top view of a construction form of the arrangement according to the invention. The distancing elements AH here are arranged as distancing elements AH11 to AHnn in a lattice structure. The individual distancing elements AH11 to AHnn are distributed in such a way, that one gap each for the insertion of a cable or an empty tube is present between two laterally adjacent distancing elements AH each as well as between two distancing elements AH adjacent in the longitudinal direction (in reference to a orthogonally running central axis of a cable).

Figure 13:
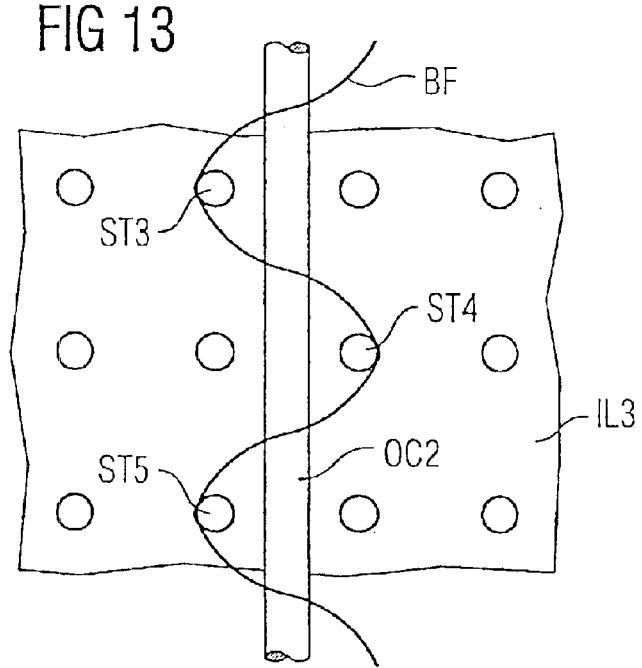

In FIG. 13 a further top view of a construction form of the invention is depicted. The distancing elements here are formed as pins ST3 to ST5. They are arranged in the longitudinal direction of the cable OC2 in reference to the central axis ZA of the canal system in such a way, that an installation canal results for the cable OC2 running through in the longitudinal direction of the canal or pipe AR. The cable OC2 in this construction form is securely positioned by an immobilization element in the form of a flat spring BF. The flat spring BF is f.e. made as a springy plastic or as round stock.

Figure 14:
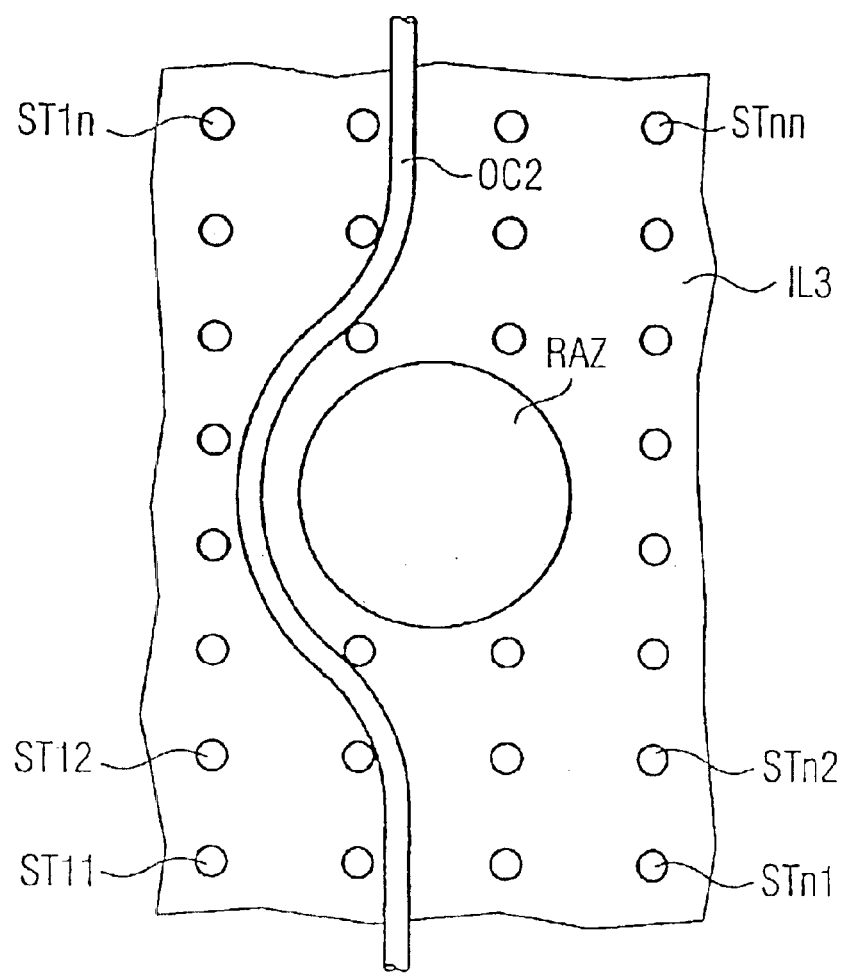

FIG. 14 shows another top view of a construction form in the arrangement according to the invention, where the distancing elements are formed as pins ST11 to STnn. The cable OC2 shows here a loop-like deflection in the area of a pipe branch RAZ, which forms an obstruction. The cable OC2 is positioned in the area of the loop-like deflections in the gaps between the distancing elements ST11 to STnn in such a way, that the cable OC2 is bent around the pipe branch RAZ. The distancing elements AH determine the path of the cable OC2 in the longitudinal and circumference direction of the canal or pipe system AR The lateral distance between two adjacent distancing elements each is greater than the outer diameter of the cable OC2. The lateral distance between to adjacent distancing elements is also chosen in such a way, that there is play for moving the cable inserted between them in the longitudinal direction as well as in the lateral direction.

In case no play for moving is necessary, a lateral distance between two adjacent distancing elements can be chosen, which is equal to the outer diameter of the cable OC2.

Figure 15:
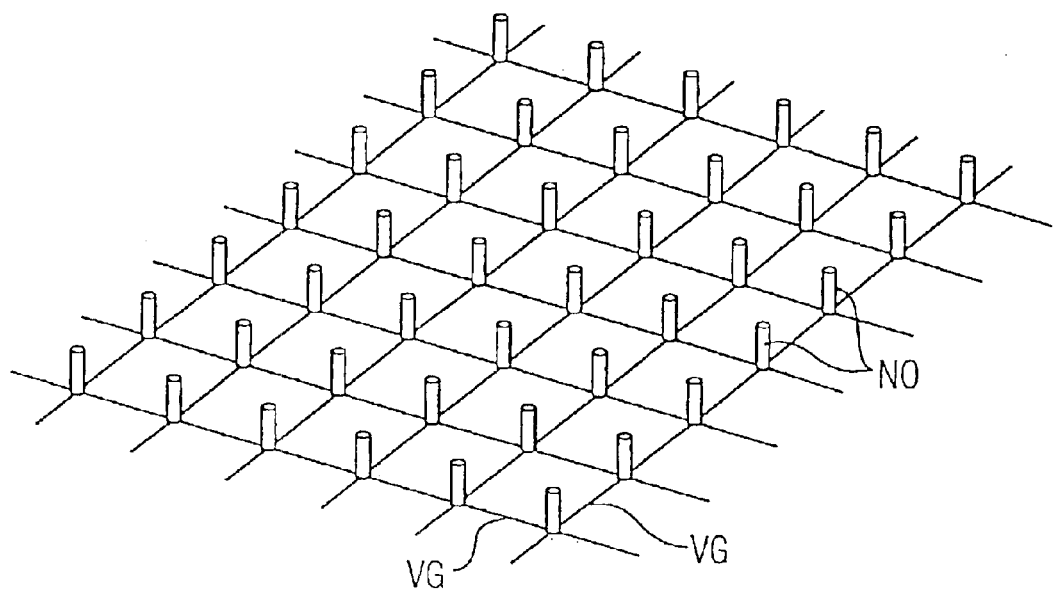

FIG. 15 shows a further top view of a construction form of the arrangement according to the invention, where the distancing elements are formed as knobs NO. A multitude of individual knobs is provided, which are coupled together by a mesh structure VG. They form a separate construction part in the ring gap RS between the casings IL1 and AL1. They can be welded to the casing IL1. The distancing elements NO or the distancing elements AH of the diagrams described previously show a radial extension of at least the outer diameter of the cable OC1, OC2 or the empty tube respectively, in reference to the central axis ZA of the canal or pipe system.

Figure 16:
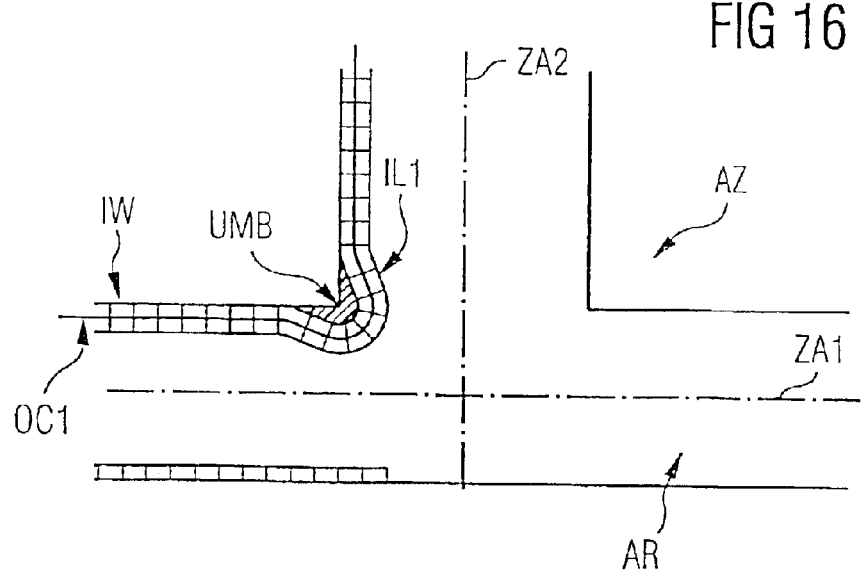

FIG. 16 shows a schematic of the construction form of a canal or pipe system AR, which shows a branch point AZ, here f.e. for a canal inlet. Two different longitudinal directions of the canal or pipe system cut across each other at the branch point AZ along the central axes ZA1 and ZA2. The casing IL1 and the cable OC1 are guided over the branch point. Additionally, it is advantageous to provide a turn UMB for cable guidance, which turns the cable OC1 at the branch point AZ into the other longitudinal direction. Since the transition of the cable OC1 from horizontal path to a vertical path occurs between the inner wall IW and the inner casing IL1, this area, which can be endangered during servicing, is protected against mechanical stress. This can also be used at a kink of the canal or pipe system.

In the following, further advantages of the invention and the previously shown construction samples are noted.

The cables or the empty tube, respectively, are protected against chemical, mechanical and thermal stresses or such. The path of a cable or empty tube can be recognized relatively easily, even after filling with the filling medium. In addition, if the inner casing is transparent, the cable as well as eventual error points, inclusions or pinholes are visible. In case the cable is placed into a metallic pipe (f.e. so-called microcable), the cable can be detected relatively easily. The casings are made from HDPE, a plastic, which is chemically highly resistant against aggressive chemicals in waste water, is temperature stable, safe against decomposition and biologically compatible. No derivative products such as epoxy resins or hardeners are flushed out. Ground water is not affected.

The previously described process for cable installation can be advantageously complimented with other processes for cable installation. Hereby a cable to be installed is stretched into the part of the canal or pipe system, which is not to be rehabilitated by means of appropriate pretension at the cable in the upper apex. Such a process has already been mentioned. The process for cable installation can also be used for different cable types, which are f.e. different in their outer diameter. Additionally, the cable installation can be continued outside the canal or pipe system, f.e. by installing the cable in a street or below ground for bridging the so-called "last mile".

The cables or the empty tube, respectively, can be placed into the ring gap at any point relative to the circumference, without affecting the hydraulics or static resistance of the cable. Additionally, several cables can be placed into the ring gap, which can be distributed onto the circumference in any way. In order to achieve the smallest possible measurements for high fiber number, f.e. 144 optical fibers for a diameter of 9.5 mm, it is preferred to insert cables with a so-called maxibundle core. Very good static resistance characteristics are achieved by using a so-called maxi-tube made from metal. Optimum protection for the cable can be achieved by using a material retention metallic pipe, which protects against hydrogen permeability. By imbedding into the filling medium, f.e. special concrete, optimum protection against corrosion is achieved.

For the arrangement of the canal or pipe system according to the invention, no deviation of the standard optimum design of a canal or pipe system, f.e. by a large cable or empty pipe, occurs. In this way, there is also no change in the flow behavior (hydraulics) because of the cable. There also is no danger of clogging, caused by the cable or the empty tube.

There is also no mechanical, chemical or biological influence on the waster water canal as well as a change of the static resistance of the canal expected, f.e. . with gluing or putting the cable or empty tube to the canal or pipe. With hardening of the glue, normally shrinking and large tensile stresses take effect. This can lead to tearing the glue and the cable or empty tube, respectively, loosening it from the wall. It is also possible for the static resistance of the canal to be affected by the high tensile stresses, which could lead to a break in the canal or pipe. These disadvantages are being avoided by this invention.

The inner wall of the existing canal system additionally does not have to be prepared chemically or mechanically, in order to guarantee a lasting and secure connection, as it would be necessary with gluing or putting. For this, a glaze present would have to be removed, in order to produce optimum adherence characteristics, which would guarantee a lasting and secure gluing. But if the glaze is removed, the stability of the canal system guaranteed by the ceramics against mechanical or chemical stresses as well as their static characteristics would be significantly diminished.

The cable or empty tube, respectively, is not in the way during cleaning processes and has optimum protection against mechanical stresses such as impacts or flushing pressure.

The invention can be extended by installing a measurement cable into the ring gap, which is used for measuring of mechanical stresses on the canal or pipe system. The cable, which can be made of optical fibers or copper wire, runs along or crosswise to the main mechanical stress. A measurement or sensor cable or one or more fibers are stressed similarly to a known elasticity measurement strip. The distancing elements serve here for determining the exact positioning of the cable. FIG. 17 shows a construction form of a device for installation of a cable OC1 into a canal or pipe system AR. The cable IC1 is inserted into the canal or pipe system AR and installed during the course of the rehabilitation. Since the cable OC1 has to be guided over the area of a manhole, it is recommended to install the cable beforehand into the inner casing IL1. According to FIG. 17, the inner casing IL1 as well as the cable OC1 are being delivered on separate storage reels VS1 and VS2. During paying off the casing IL1 and the cable OC1, respectively, from the reels VS1 and VS2, respectively, the two components are brought together by means of pressure pulleys FR1 and FR2. A insertion device EVO, f.e. in the form of a forming tool, is provided, which causes a position controlled insertion of the cable OC1 onto the inner casing IL1, so that the cable OC1 comes to rest between the distancing elements.

Figure 1:
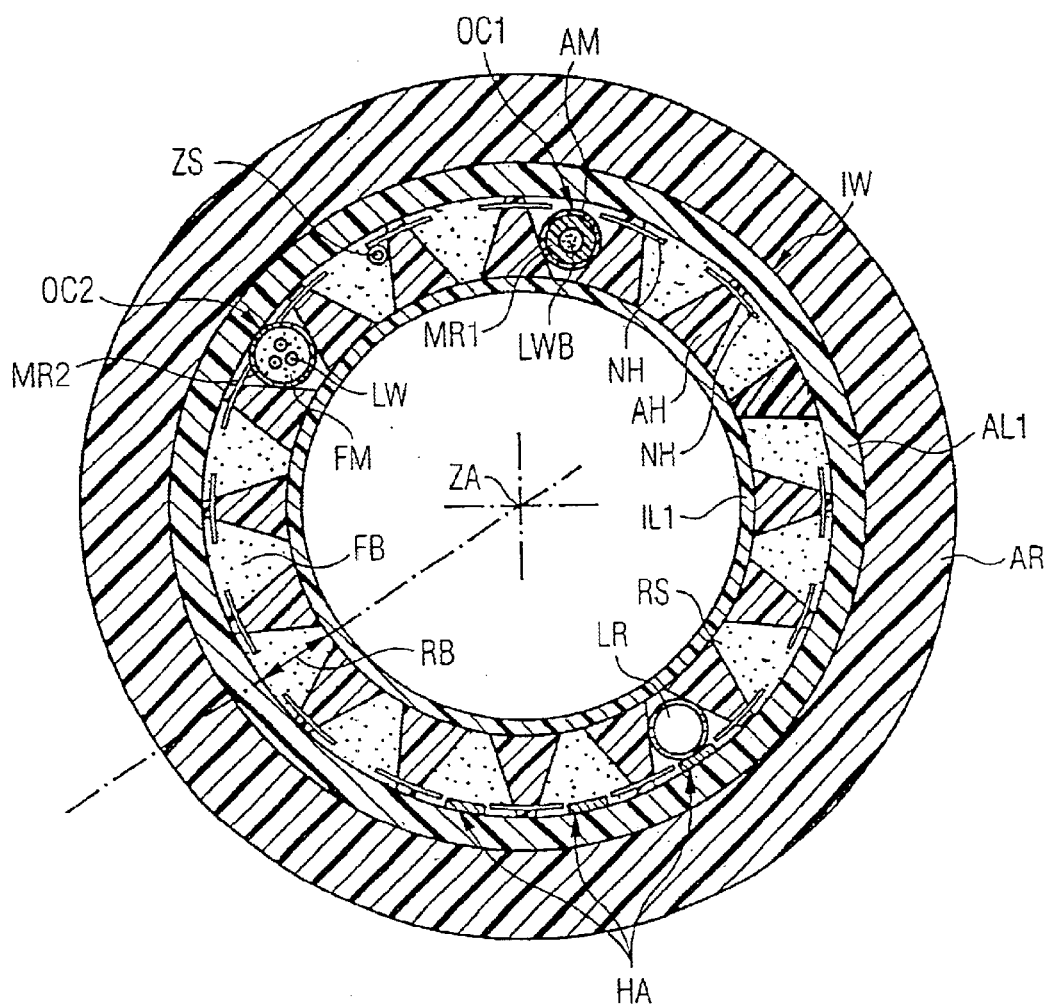
Figure 2:
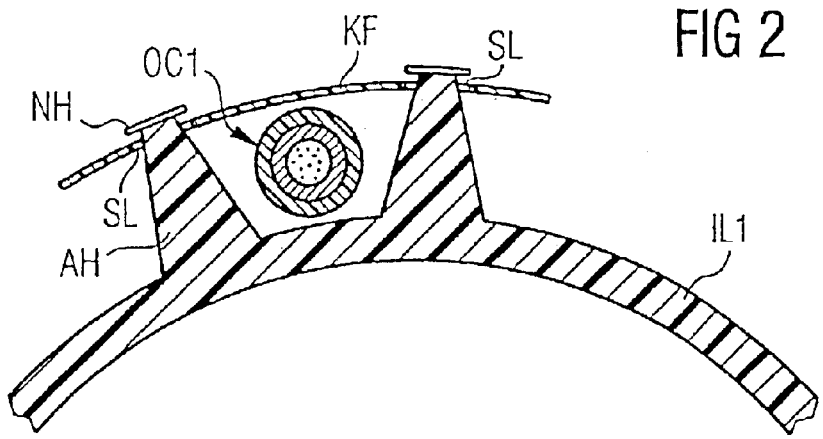
Figure 3:
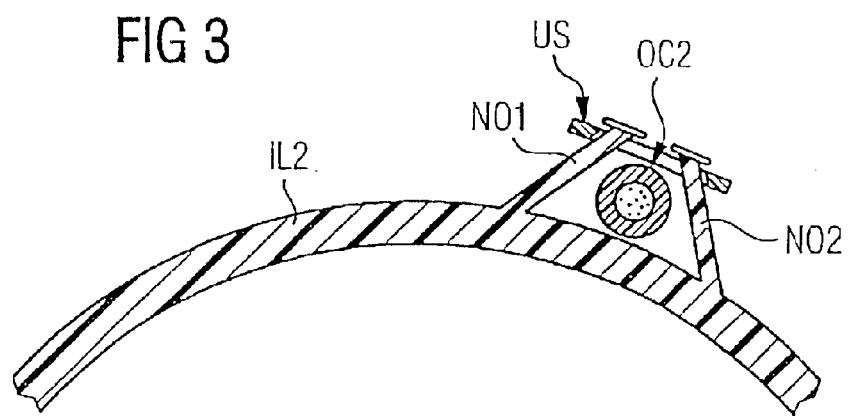
Figure 4:
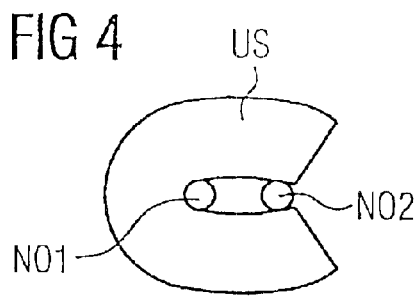
Figure 5:
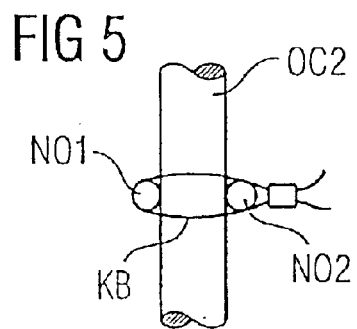
FIG. 5 shows an arrangement, where a cable binder KB is provided between the knobs NO1 and NO2, which secures the cable OC2 against a radial slipping out.

The described components together form the insertion device EV, by means of which the inner casing IL1 and the outer casing AL1 are inserted into the canal or pipe system AR, so that a ring gap is formed between the inner casing IL1 and the outer casing AL1. The outer casing AL1 in FIG. 1 is already placed in the desired position. The inner casing IL1 and the cable OC1 are inserted into the outer casing AL1 through a manhole and pulled into the longitudinal direction of the canal, designated as direction F. A manhole is always between individual cable segments, shown in FIG. 17 by the cable segments KO1 and KO2.

The cable preferably is inserted by the insertion device EVO in gaps between two adjacent distancing elements, so that a fastening of the cable is connected with it. The fastening can f.e. be done by means of an immobilizing element, as shown in previous construction samples. Fastening can additionally occur, when the gaps between the distancing elements show a lateral distance of f.e. the outer diameter of the cable. Additionally a far reaching fastening is possible, when the appropriate cable is inserted between the distancing elements in a winding manner.

What is claimed is:

1. A process for installation of at least one cable or empty tube into a canal or pipe system,
   where at least one outer casing is placed into the canal or pipe system,
   where subsequently at least one inner casing is inserted by means of distancing elements, so that a ring gap is created between the inner and outer casings,
   where the cable or empty tube to be installed is inserted with the inner casing in such a way, that the respective cable or empty tube comes to rest in the ring gap.

2. The process according to claim 1, wherein a multitude of individual distancing elements being used for the distancing medium and the respective cable or empty tube being inserted into a gap between two adjacent distancing elements each.

3. The process according to claim 2, wherein the respective cable or empty tube is secured in its position after insertion into the gap between the two distancing elements against slipping out in the radial direction of the canal or pipe system by means of at least one additional immobilizing element.

4. The process according to claim 3, wherein the additional immobilizing element being placed at each radial end of the distancing elements, between which the respective cable or empty tube has been inserted.

5. The process according to claim 2, wherein the distancing elements being preformed in such a way, that they show extension in the radial direction of the canal or pipe system after being installed between the inner and outer casings.

6. The process according to claim 2, wherein the respective cable or empty tube being inserted during the manufacture of the inner casing between the distancing elements.

7. The process according to claim 1, wherein the hollow space of the ring gap being finally filled with a filling medium for mechanical stabilization.

8. The process according to claim 1, wherein the outer casing being inserted in such a way into the canal or pipe system, that the outer casing is clothing and contacting the inner wall of the canal all around.

9. A process for the rehabilitation of a canal or pipe system, into which at least one cable or an empty tube is installed at an inner wall of the canal or pipe system,
where at least one casing by means of distancing elements is placed into the canal or pipe system, so that a ring gap between the inner wall of the canal or pipe system and the casing is created,
where the casing is inserted in such a way, that the respective cable or empty tube is arranged in the ring gap.

10. The process according to claim 9, wherein a multitude of distancing elements being used as distancing medium and the respective cable or empty tube being arranged in a gap between two adjacent distancing elements each.

11. The process according to one of the claims 9 or 10, wherein the hollow space of the ring gap finally being filled with a filling medium for mechanical stabilization.

12. A canal or pipe system with at least one installed cable or empty tube,
where at least one casing is arranged by means of distancing elements in the canal or pipe system in such a way, that a ring gap is created between an inner wall of the canal or pipe system and the casing,
where the respective cable or empty tube is arranged in the ring gap and the path of the cable and/or empty tube in the longitudinal and circumferential direction of the canal or pipe system is set by the distancing elements.

13. The canal or pipe system according to claim 12, wherein at least one outer casing being arranged in the canal or pipe system between the inner wall of the canal or pipe system and the casing, so that the ring gap between the casing and the outer casing is being formed.

14. The canal or pipe system according to claim 13, wherein the outer casing showing knob-shaped distancing elements on the side of the ring gap, on which the cable or empty tube rests, so that it can be encased by the filling medium.

15. The canal or pipe system according to claim 12, wherein the respective cable or empty tube being movable in the longitudinal direction of the canal or pipe system.

16. The canal or pipe system according to claim 12, wherein at least one of the two casings showing a multitude of individual distancing elements on the side facing the other casing.

17. The canal or pipe system according to claim 16, wherein the individual distancing elements being distributed in the ring gap between the inner and outer casing in such a way, that between two laterally adjacent distancing elements each as well as between two adjacent distancing elements in the longitudinal direction, one gap each is present for the insertion of the respective cable or empty tube.

18. The canal or pipe system according to claim 16, wherein the respective cable or empty tube being positioned securely in a gap between two adjacent distancing elements by means of at least one additional immobilizing element against slipping out in the radial direction.

19. The canal or pipe system according to claim 16, wherein the distancing elements stretching from the casing at a slanting angle, so that a fastening of the cable or empty tube occurs.

20. The canal or pipe system according to claim 16, wherein the distancing elements being formed in such a way, that through its formation a fastening of the cable or the empty tube occurs.

21. The canal or pipe system according to claim 16, wherein the distancing elements showing a radial extension of at least the outer diameter of the respective cable or empty tube relative to the central axis of a canal or pipe.

22. The canal or pipe system according to claim 16, wherein the gaps in the ring gap between the distancing elements being filled with a filling medium for the purpose of mechanical stabilization.

23. The canal or pipe system according to claim 16, wherein the distancing elements being distributed in the longitudinal direction in such a way, that an insertion canal running in the longitudinal direction of a canal or pipe for the respective cable or the empty tube results.

24. The canal or pipe system according to claim 16, wherein the respective cable or empty tube being positioned in the area of a pipe or canal branching or any other obstruction in the gaps between the distancing elements in such a way, that it is bent around the obstruction.

25. The canal or pipe system according to claim 16, wherein a lateral distance between two adjacent distancing elements each being selected at least equal to the outer diameter of the respective cable or empty tube.

26. The canal or pipe system according to claim 16, wherein a lateral distance between two adjacent distancing elements each being selected in such a way, that play for moving is available for the cable or empty tube inserted in between.

27. The canal or pipe system according to claim 16, wherein a hoisting rope being inserted into the ring gap, to which the cable or empty tube can be fastened.

28. The canal or pipe system according to claim 12, wherein a multitude of distancing elements being provided, which are coupled to each other by means of a lattice structure in such a way, that the distance elements form a separate construction part in the ring gap between the casings.

29. The canal or pipe system according to claim 12, wherein
the canal or pipe system showing at least one kinking point or branching point, where two different longitudinal directions of the canal or pipe system (AR) cut across each other, and
the casing and the cable and/or empty tube being guided over the kinking or branching point.

30. A device for the installation of at least one cable or empty tube into a canal or pipe system during its rehabilitation,
where at least one insertion device is being provided, by means of which at least one inner casing and at least one outer casing can be placed into the canal or pipe system with distancing elements in such a way, that a ring gap is created between the inner casing and the outer casing,
where an insertion device is being provided for position controlled insertion of the cable or the empty tube with at least one casing, so that the respective cable or empty tube comes to rest in the ring gap.

31. The device according to claim 30, wherein the distancing medium being constructed as a multitude of individual distancing elements and an insertion and a connected fastening of the respective cable or empty tube into the gaps between two adjacent distancing elements each occurs by means of the insertion device.

* * * * *